United States Patent
Sakai

(10) Patent No.: US 11,990,282 B2
(45) Date of Patent: May 21, 2024

(54) MULTILAYER CERAMIC CAPACITOR

(71) Applicant: Murata Manufacturing Co., Ltd., Nagaokakyo (JP)

(72) Inventor: Taro Sakai, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 492 days.

(21) Appl. No.: 16/822,067

(22) Filed: Mar. 18, 2020

(65) Prior Publication Data
US 2020/0312567 A1    Oct. 1, 2020

(30) Foreign Application Priority Data
Mar. 28, 2019    (JP) ................. 2019-064073

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |

(52) U.S. Cl.
CPC ............ *H01G 4/30* (2013.01); *H01G 4/008* (2013.01); *H01G 4/012* (2013.01); *H01G 4/1209* (2013.01)

(58) Field of Classification Search
CPC ........ H01G 4/30; H01G 4/224; H01G 4/1245; H01G 4/248; H01G 4/252; H01G 4/1236; H01G 4/1227; H01G 4/008; H01G 4/1209; H01G 4/12; H01G 4/012; H01G 4/232
See application file for complete search history.

(56) References Cited

U.S. PATENT DOCUMENTS

| | | | | |
|---|---|---|---|---|
| 9,123,472 B2* | 9/2015 | Kim | ........... | H01G 4/12 |
| 10,903,007 B2* | 1/2021 | Ono | ........... | H01G 4/30 |
| 11,031,180 B2* | 6/2021 | Kato | ........... | H01G 4/012 |
| 2006/0043523 A1 | 3/2006 | Ito et al. | | |

(Continued)

FOREIGN PATENT DOCUMENTS

JP    2006-073623 A    3/2006

OTHER PUBLICATIONS

Kimura, "Multilayer Ceramic Capacitor", U.S. Appl. No. 16/822,064, filed Mar. 18, 2020.

(Continued)

*Primary Examiner* — David M Sinclair
*Assistant Examiner* — Daniel M Dubuisson
(74) *Attorney, Agent, or Firm* — Keating & Bennett, LLP

(57) ABSTRACT

A multilayer ceramic capacitor includes a laminate and an external electrode. The laminate includes a central layer portion in which first and second internal electrode layers are alternately laminated with a dielectric ceramic layer therebetween, a peripheral layer portion sandwiching the central layer portion in the lamination direction, and a side margin sandwiching the central layer portion and the peripheral layer portion in the width direction. When a point P indicates an end in the width direction of the internal electrode layer closest to a main surface of the laminate, and a point Q indicates a point where a boundary between the peripheral layer portion including the point P and the side margin including the point P intersects the main surface, and an imaginary line IL is drawn to pass through the point P and the point Q, the boundary is curved from the imaginary line IL.

19 Claims, 8 Drawing Sheets

(56) References Cited

U.S. PATENT DOCUMENTS

| | | | |
|---|---|---|---|
| 2013/0063862 A1* | 3/2013 | Kim | H01G 4/30 |
| | | | 361/305 |
| 2014/0347783 A1* | 11/2014 | Kisumi | H01G 4/012 |
| | | | 361/301.4 |
| 2017/0169952 A1* | 6/2017 | Kato | H01G 4/232 |
| 2017/0243697 A1* | 8/2017 | Mizuno | H01G 4/232 |
| 2017/0301470 A1* | 10/2017 | Asai | H01G 4/232 |
| 2017/0330686 A1* | 11/2017 | Sugita | H01G 4/30 |
| 2019/0362897 A1* | 11/2019 | Kato | H01G 4/232 |
| 2020/0152391 A1* | 5/2020 | Kang | H01G 4/12 |
| 2020/0203074 A1* | 6/2020 | Ono | H01G 4/012 |

OTHER PUBLICATIONS

Yokomizo et al., "Multilayer Ceramic Capacitor", U.S. Appl. No. 16/822,065, filed Mar. 18, 2020.
Doi et al., "Multilayer Ceramic Capacitor", U.S. Appl. No. 16/822,068, filed Mar. 18, 2020.
Harada et al., "Multilayer Ceramic Capacitor", U.S. Appl. No. 16/822,069, filed Mar. 18, 2020.
Uchida, "Multilayer Ceramic Capacitor", U.S. Appl. No. 16/822,070, filed Mar. 18, 2020.

* cited by examiner

MULTILAYER CERAMIC CAPACITOR

CROSS REFERENCE TO RELATED APPLICATIONS

This application claims the benefit of priority to Japanese Patent Application No. 2019-064073 filed on Mar. 28, 2019. The entire contents of this application are hereby incorporated herein by reference.

BACKGROUND OF THE INVENTION

1. Field of the Invention

The present invention relates to a multilayer ceramic capacitor.

2. Description of the Related Art

For example, JP 2006-73623 A describes, as a method of producing a multilayer ceramic capacitor, a method of alternately laminating green sheets and internal electrode layers before sintering to form a green chip, sintering the green chip, and then forming an external electrode on an end surface of a capacitor element body.

In recent years, large-capacitance and small-sized multilayer ceramic capacitors have been demanded. In order to achieve such a multilayer ceramic capacitor, it is effective to increase effective areas of internal electrode layers occupying green sheets, that is, the areas of the internal electrode layers that oppose each other.

In the method described in JP 2006-73623 A, it is necessary to provide a large margin for cutting in consideration of the printing accuracy of the internal electrode layers and the lamination accuracy of the green sheets. Therefore, the method is disadvantageous in producing a large-capacitance and small-size multilayer ceramic capacitor.

Therefore, a method of forming a dielectric ceramic layer called a side margin on a lateral surface of a green chip has been proposed. Specifically, ceramic green sheets each having a raw internal electrode layer disposed on the surface thereof are laminated to produce a mother block, and then the mother block is cut to produce a green chip. When the green chip is produced, the mother block is cut such that the internal electrode layer is exposed on a lateral surface on which no external electrode is formed. For example, the side margin is formed, for example, by bonding a ceramic green sheet to a lateral surface of the cut green chip. According to the method, the internal electrode layer can be formed over the entire width of the green chip, so that a large-capacitance and small-size multilayer ceramic capacitor can be produced.

However, when the side margin is formed by bonding, the side margin may be separated from the green chip.

SUMMARY OF THE INVENTION

Preferred embodiments of the present invention provide multilayer ceramic capacitors each including a side margin that is less likely to separate.

A multilayer ceramic capacitor according to a preferred embodiment of the present invention includes a laminate including a dielectric ceramic layer and an internal electrode layer that are laminated in a lamination direction and an external electrode connected to the internal electrode layer. The laminate includes a first main surface and a second main surface that oppose each other in the lamination direction, a first lateral surface and a second lateral surface that oppose each other in a width direction perpendicular or substantially perpendicular to the lamination direction, and a first end surface and a second end surface that oppose each other in a length direction perpendicular or substantially perpendicular to the lamination direction and the width direction. The internal electrode layer includes a first internal electrode layer extending to the first end surface and a second internal electrode layer extending to the second end surface so as to oppose the first internal electrode layer with the dielectric ceramic layer therebetween. The external electrode includes a first external electrode disposed on the first end surface and connected to the first internal electrode layer, and a second external electrode disposed on the second end surface and connected to the second internal electrode layer. The laminate includes a central layer portion in which the first internal electrode layer and the second internal electrode layer are alternately laminated with the dielectric ceramic layer therebetween, a peripheral layer portion sandwiching the central layer portion in the lamination direction, and a side margin sandwiching the central layer portion and the peripheral layer portion in the width direction. When viewing the laminate through a cross section parallel or substantially parallel to the width direction and the lamination direction at a central portion in the length direction of the laminate, a point P indicates an end in the width direction of the internal electrode layer closest to the first main surface or the second main surface of the laminate, a point Q indicates a point where a boundary between the peripheral layer portion including the point P and the side margin including the point P intersects the first main surface or the second main surface of the laminate, and an imaginary line IL is drawn to pass through the point P and the point Q, the boundary is curved from the imaginary line IL.

Multilayer ceramic capacitors according to preferred embodiments of the present invention each include a side margin that is less likely to separate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Multilayer ceramic capacitors according to preferred embodiments of the present invention are described in detail below with reference to the drawings. The present invention is not limited to the following preferred embodiments, and may be suitably modified without departing from the gist of the present invention. Combinations of two or more preferred features described in the following preferred embodiments are also within the scope of the present invention.

Multilayer Ceramic Capacitor

Figure 1:
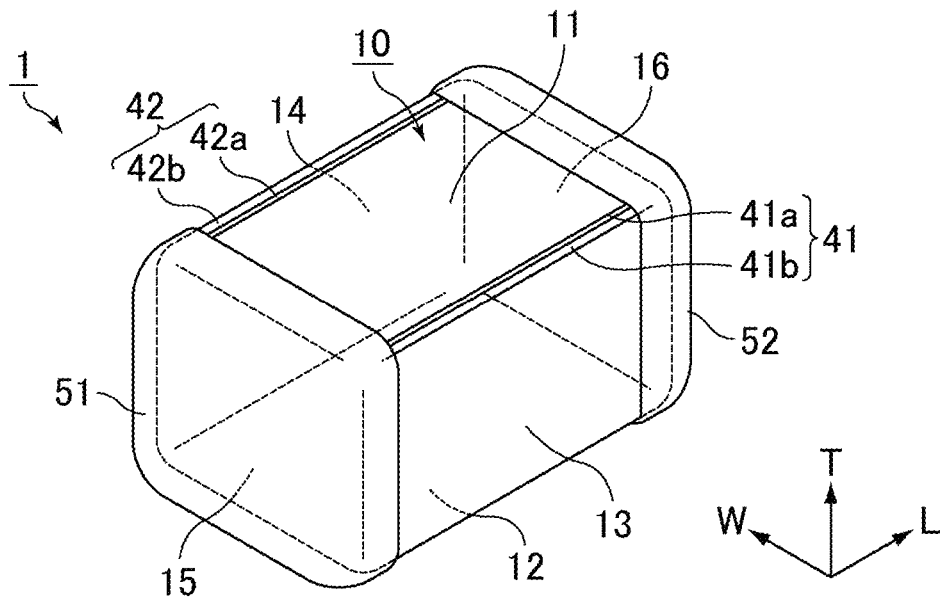
FIG. 1 is a perspective view schematically showing an example of a multilayer ceramic capacitor according to a preferred embodiment of the present invention.
Figure 2:
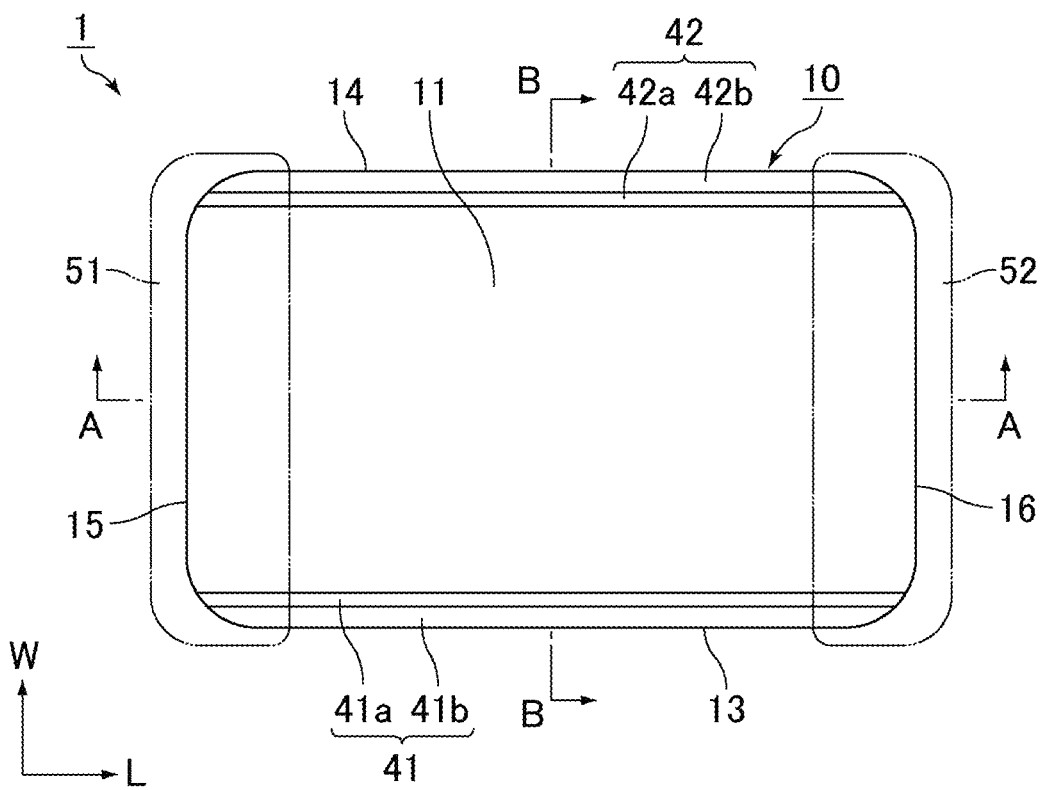
FIG. 2 is a plan view showing the multilayer ceramic capacitor shown in FIG. 1 viewed from a first main surface.

FIG. 1 is a perspective view schematically showing an example of a multilayer ceramic capacitor according to a preferred embodiment of the present invention. FIG. 2 is a plan view showing the multilayer ceramic capacitor shown in FIG. 1 viewed from a first main surface.

Herein, the "lamination direction", "width direction", and "length direction" of the multilayer ceramic capacitor and the laminate indicate directions specified by arrows T, W, and L, respectively, in a multilayer ceramic capacitor 1 and a laminate 10 shown in FIG. 1. The lamination (T) direction, the width (W) direction, and the length (L) direction are perpendicular or substantially perpendicular to each other.

The multilayer ceramic capacitor 1 shown in FIG. 1 and FIG. 2 includes the laminate 10, a first external electrode 51 on one end surface of the laminate 10, and a second external electrode 52 on the other end surface of the laminate 10.

As shown in FIG. 1, the laminate 10 is a rectangular parallelepiped or a substantially rectangular parallelepiped. The laminate 10 includes a first main surface 11 and a second main surface 12 that oppose each other in the lamination (T) direction, a first lateral surface 13 and a second lateral surface 14 that oppose each other in the width (W) direction perpendicular or substantially perpendicular to the lamination (T) direction, and a first end surface 15 and a second end surface 16 that oppose each other in the length (L) direction perpendicular or substantially perpendicular to the lamination (T) direction and the width (W) direction.

In the laminate 10, corners and edges are preferably rounded. Each corner of the laminate 10 is a portion where three surfaces of the laminate 10 meet. Each edge of the laminate 10 is a portion where two surfaces of the laminate 10 meet.

Figure 3:
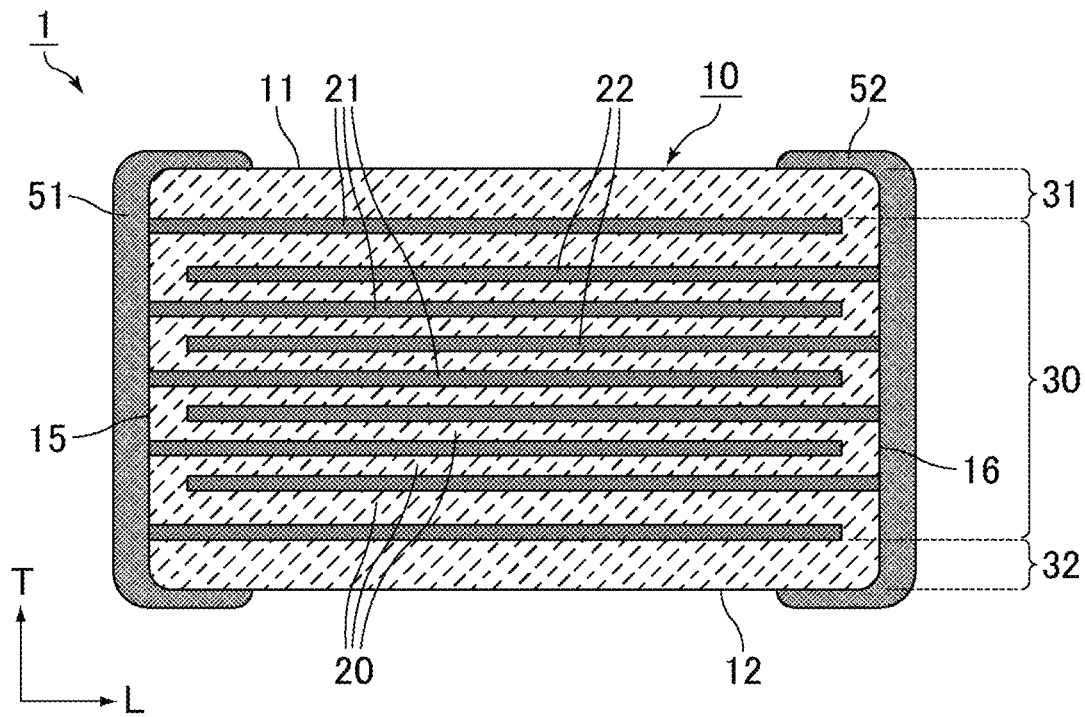
FIG. 3 is a cross-sectional view taken along the line A-A of the multilayer ceramic capacitor shown in FIG. 2.

FIG. 3 is a cross-sectional view taken along the line A-A of the multilayer ceramic capacitor shown in FIG. 2. FIG. is a cross-sectional view taken along the line B-B of a laminate the multilayer ceramic capacitor shown in FIG. 2.

Herein, a cross section of the multilayer ceramic capacitor 1 or the laminate 10 perpendicular or substantially perpendicular to the first end surface 15 and the second end surface 16 and parallel or substantially parallel to the lamination (T) direction is referred to as an LT cross section that is a cross section in the length (L) direction and the lamination (T) direction. A cross section of the multilayer ceramic capacitor 1 or the laminate 10 perpendicular or substantially perpendicular to the first lateral surface 13 and the second lateral surface 14 and parallel or substantially parallel to the lamination (T) direction is referred to as a WT cross section that is a cross section in the width (W) direction and the lamination (T) direction. A cross section of the multilayer ceramic capacitor 1 or the laminate 10 perpendicular or substantially perpendicular to the first lateral surface 13, the second lateral surface 14, the first end surface 15, and the second end surface 16, and perpendicular or substantially perpendicular to the lamination (T) direction is referred to as an LW cross section that is a cross section in the length (L) direction and the width (W) direction. Thus, FIG. 3 shows the LT cross section of the multilayer ceramic capacitor 1, and FIG. 4 shows the WT cross section of the laminate 10.

Figure 4:
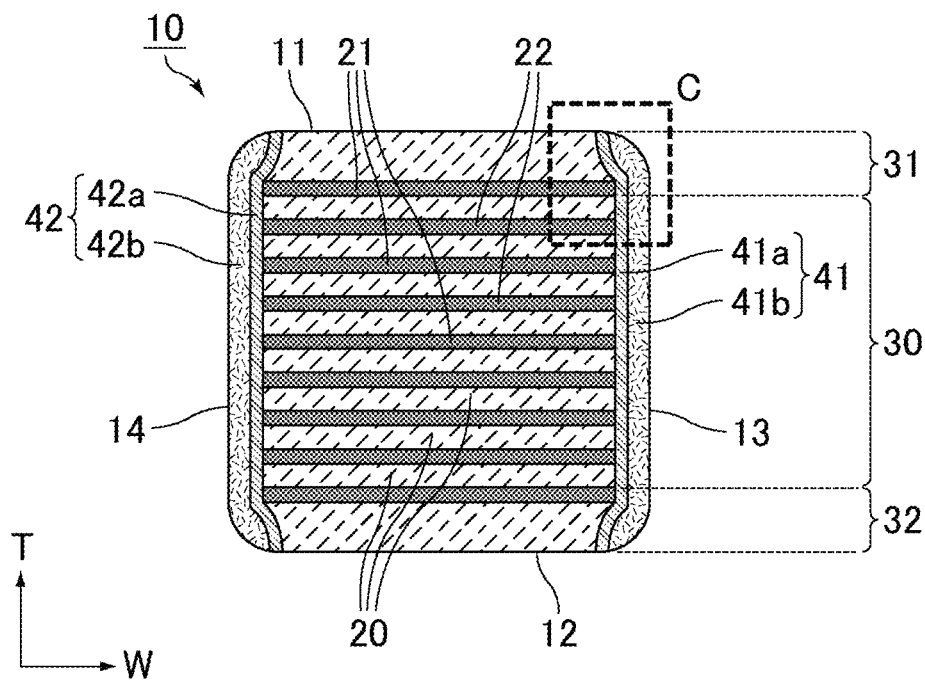
FIG. 4 is a cross-sectional view taken along the line B-B of a laminate of the multilayer ceramic capacitor shown in FIG. 2.

As shown in FIG. 3 and FIG. 4, the laminate 10 includes multiple dielectric ceramic layers 20, multiple first internal electrode layers 21, and multiple second internal electrode layers 22, laminated in the lamination (T) direction.

The dielectric ceramic layers 20 extend along the width (W) direction and the length (L) direction.

The first internal electrode layers 21 and the second internal electrode layers 22 are each provided along the interfaces between the dielectric ceramic layers 20. The first internal electrode layers 21 and the second internal electrode layers 22 each extend flatly or substantially flatly along the dielectric ceramic layer 20.

The first internal electrode layers 21 extend to the first end surface 15 of the laminate 10. The second internal electrode layers 22 extend to the second end surface 16 of the laminate 10 so as to oppose the first internal electrode layers with the dielectric ceramic layers 20 therebetween.

Specifically, each first internal electrode layer 21 and each second internal electrode layer 22 oppose each other with the dielectric ceramic layer 20 therebetween in the lamination (T) direction. Capacitance is generated from each portion where the first internal electrode layer 21 and the second internal electrode layer 22 oppose each other with the dielectric ceramic layer 20 therebetween.

Each of the first internal electrode layers 21 and the second internal electrode layers 22 preferably includes at least one metal selected from the group consisting of Ni, Cu, Ag, Pd, Au, and Ag—Pd alloy. In addition to the one or more metals, the first internal electrode layers 21 and the second internal electrode layers 22 may each include the same dielectric ceramic material as that of the dielectric ceramic layers 20.

The first external electrode 51 is disposed on the first end surface 15 of the laminate 10. As shown in FIG. 3, the first external electrode 51 is preferably disposed so as to extend from the first end surface 15 of the laminate 10 over a portion of each of the first main surface 11 and the second main surface 12, and as shown in FIG. 1, the first external electrode 51 is more preferably disposed so as to extend from the first end surface 15 of the laminate 10 over a portion of each of the first main surface 11, the second main surface 12, the first lateral surface 13, and the second lateral surface 14. The first external electrode 51 is connected to the first internal electrode layers 21 on the first end surface 15.

The second external electrode 52 is disposed on the second end surface 16 of the laminate 10. As shown in FIG. 3, the second external electrode 52 is preferably disposed so as to extend from the second end surface 16 of the laminate 10 over a portion of each of the first main surface 11 and the second main surface 12, and as shown in FIG. 1, the second external electrode 52 is more preferably disposed so as to extend from the second end surface 16 of the laminate 10 over a portion of each of the first main surface 11, the second main surface 12, the first lateral surface 13, and the second lateral surface 14. The second external electrode 52 is connected to the second internal electrode layers 22 on the second end surface 16.

Each of the first external electrode 51 and the second external electrode 52 preferably includes a Ni layer including, for example, Ni and a ceramic material. The Ni layer is a base electrode layer. Such a Ni layer can be formed by a co-fire method in which the Ni layer is sintered simultaneously with the first internal electrode layer 21 and the second internal electrode layer 22. The Ni layer is preferably directly disposed on the laminate 10.

The types of elements included in the first external electrode 51 and the second external electrode 52 can be determined by elemental analysis by transmission electron microscope-energy dispersive X-ray spectroscopy (TEM-EDX).

The ceramic material is preferably present in the Ni layer in an amount of about 25 area % or more and about 40 area % or less, for example. In this case, the Ni layer can be easily formed by the co-fire method.

Further, the amount of the ceramic material in the Ni layer is preferably about 35 area % or less, for example.

The amount of the ceramic material in the Ni layer is measured by the following method using a wavelength dispersive X-ray analyzer (WDX). First, a cross section of a central portion in the width (W) direction of the multilayer ceramic capacitor 1 is exposed, and a central portion of the thickness of the Ni layer at a central portion in the lamination (T) direction of the laminate 10 is magnified by 10,000 times. A visual field of a magnified area is set to about 6 μm×about 8 μm, for example. Then, the magnified area is mapped by WDX, and an area ratio is measured from an image obtained by the mapping.

The first external electrode 51 preferably includes, for example, a Ni layer, a first plating layer, and a second plating layer in order from the first end surface 15 side of the laminate 10. Similarly, the second external electrode 52 preferably includes, for example, a Ni layer, a first plating layer, and a second plating layer in order from the second end surface 16 side of the laminate 10. The first plating layer is preferably formed by Ni plating, and the second plating layer is preferably formed by Sn plating, for example. Each of the first external electrode 51 and the second external electrode 52 may include a conductive resin layer including conductive particles and a resin between the Ni layer and the first plating layer. Examples of the conductive particles in the conductive resin layer include metal particles of Cu, Ag, Ni or the like.

The Ni layer may be formed by a post-fire method in which a conductive paste is applied and baked. In this case, the Ni layer may not include any ceramic material.

Alternatively, the first external electrode 51 and the second external electrode 52 may each include a base electrode layer including metal such as Cu, for example. The base electrode layer may be formed by the co-fire method or the post-fire method. The base electrode layer may be a multilayer.

For example, the first external electrode 51 may have a four-layered structure including a Cu layer that defines and functions as a base electrode layer, a conductive resin layer including conductive particles and a resin, a first plating layer, and a second plating layer in order from the first end surface 15 side of the laminate 10. Similarly, the second external electrode 52 may have a four-layered structure including a Cu layer that defines and functions as a base electrode layer, a conductive resin layer including conductive particles and a resin, a first plating layer, and a second plating layer in order from the second end surface 16 side of the laminate 10.

As shown in FIG. 3 and FIG. 4, the laminate 10 includes a central layer portion 30, peripheral layer portions 31 and 32, and side margins 41 and 42.

In the central layer portion 30, the first internal electrode layers 21 and the second internal electrode layers 22 are alternately laminated with the dielectric ceramic layers 20 therebetween. In FIG. 3 and FIG. 4, the central layer portion 30 includes a region that is sandwiched by the first internal electrode layer 21 closest to the first main surface 11 and the first internal electrode layer 21 closest to the second main surface 12 in the lamination (T) direction.

The dielectric ceramic layers 20 defining the central layer portion 30 preferably include, for example, a dielectric ceramic material including as a main component a perovskite compound including Ba and Ti. Examples of the perovskite compound include $BaTiO_3$. The dielectric ceramic material in the dielectric ceramic layer 20 defining the central layer portion 30 may include, for example, at least one additive selected from the group consisting of Si, Mg, Mn, Al, Zr, Ho, and Zn.

Herein, the "main component" means a component having the largest content in the ceramic material such as the dielectric ceramic material. The "additive" means a component whose content in the ceramic material such as the dielectric ceramic material is about 5 mol or less relative to 100 mol of Ti as a main component. The content of the main component in the ceramic material and the content of the additive in the ceramic material can be determined by quantitative analysis by inductively coupled plasma (ICP) emission spectroscopy.

The peripheral layer portions 31 and 32 sandwich the central layer portion 30 therebetween in the lamination (T) direction. The peripheral layer portion 31 is on the first main surface 11 side of the laminate 10. The peripheral layer portion 32 is on the second main surface 12 side of the laminate 10.

The peripheral layer portions 31 and 32 each include a ceramic material.

The peripheral layer portions 31 and 32 each preferably include, for example, a dielectric ceramic material including as a main component a perovskite compound (e.g., $BaTiO_3$) including Ba and Ti. The dielectric ceramic material in the peripheral layer portions 31 and 32 may include, for example, at least one additive selected from the group consisting of Si, Mg, Mn, Al, Zr, Ho, and Zn.

The peripheral layer portions 31 and 32 each preferably include multiple dielectric ceramic layers 20 laminated in the lamination (T) direction. The peripheral layer portions 31 and 32 may each have a multilayer structure or a single-layer structure including a single dielectric ceramic layer 20.

When the peripheral layer portions 31 and 32 each include the dielectric ceramic layer 20, the dielectric ceramic layer 20 defining each of the peripheral layer portions 31 and 32 may include the same dielectric ceramic material as that of the dielectric ceramic layer 20 defining the central layer portion 30, or may include a dielectric ceramic material different from that of the dielectric ceramic layer 20 defining the central layer portion 30.

The side margins 41 and 42 sandwich the central layer portion 30, the peripheral layer portion 31, and the peripheral layer portion 32 in the width (W) direction. The side margin 41 is on the first lateral surface 13 side of the laminate 10. The side margin 42 is on the second lateral surface 14 side of the laminate 10. In FIG. 4, the side margin 41 has a two-layered structure including an inner layer 41a on an innermost side in the width (W) direction and an outer layer 41b on an outermost side in the width (W) direction, and the side margin 42 has a two-layered structure including an inner layer 42a on an innermost side in the width (W) direction and an outer layer 42b on an outermost side in the width (W) direction.

Figure 5:
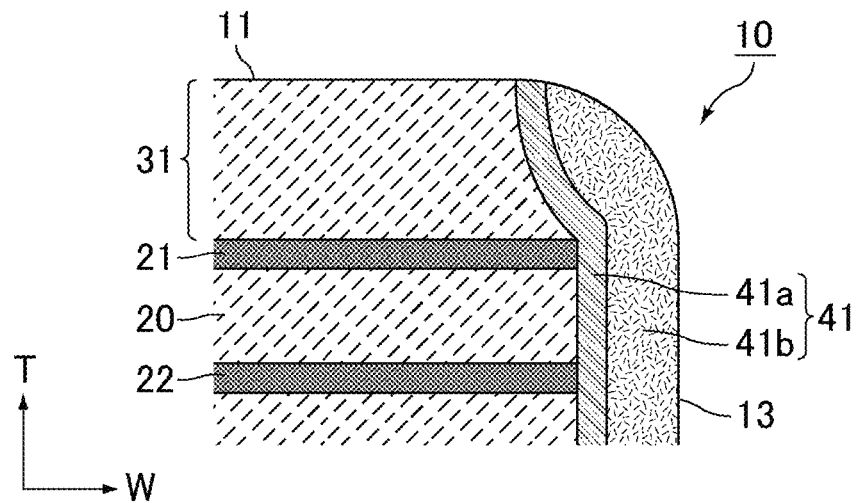
FIG. 5 is an example of an enlarged view of a portion C of the laminate shown in FIG. 4.

FIG. 5 is an example of an enlarged view of a portion C of the laminate shown in FIG. 4. As shown in FIG. 5, the boundary between the peripheral layer portion 31 and the side margin 41 is curved.

Figure 6:
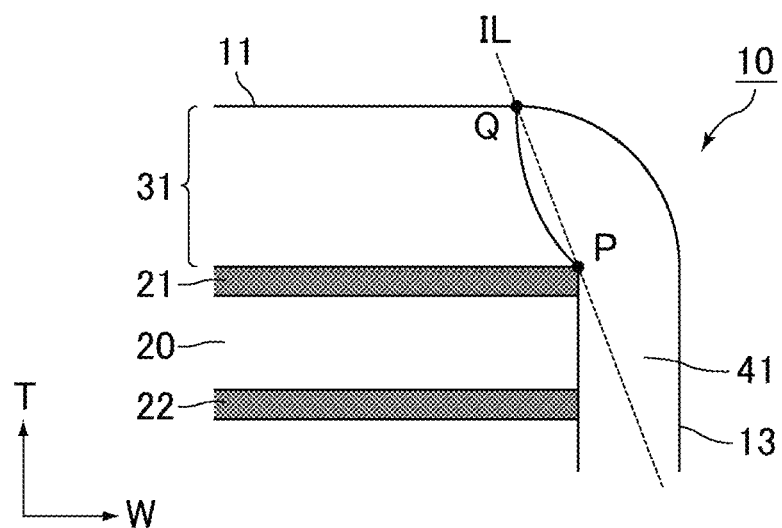
FIG. 6 is a schematic view illustrating the shape of a boundary between a peripheral layer portion and a side margin.

FIG. 6 is a schematic view illustrating the shape of a boundary between a peripheral layer portion and a side margin. As shown in FIG. 6, a point P indicates an end in the width direction of an internal electrode layer (first internal electrode layer 21 in FIG. 6) closest to the first main surface 11 of the laminate 10, a point Q indicates a point where a boundary between the peripheral layer portion 31 including the point P and the side margin 41 including the point P intersects the first main surface 11 of the laminate 10, and an imaginary line IL is drawn so as to pass through the point P and the point Q. In FIG. 6, the boundary between the peripheral layer portion 31 and the side margin 41 does not overlap the imaginary line IL. This means that "the boundary between the peripheral layer portion 31 and the side margin 41 is curved from the imaginary line IL".

When the boundary between the peripheral layer portion 31 and the side margin 41 is curved from the imaginary line IL, the side margin 41 is less likely to separate due to an anchoring effect.

The shape of the boundary between the peripheral layer portion and the side margin can be determined by observing a WT cross section of the laminate 10 at the central portion in the length (L) direction of the multilayer ceramic capacitor 1. Specifically, a WT cross section of the laminate 10 at the central portion in the length (L) direction of the multilayer ceramic capacitor 1 is exposed by polishing. If necessary, the polished surface is etched to remove the first internal electrode layer 21 and the second internal electrode layer 22 stretched by polishing. Then, the exposed WT cross section of the laminate 10 is observed with a scanning electron microscope (SEM).

Similarly, in FIG. 4, a boundary between the peripheral layer portion 31 and the side margin 42, a boundary between the peripheral layer portion 32 and the side margin 41, and a boundary between the peripheral layer portion 32 and the side margin 42 are also preferably curved. Not all of the boundaries between the peripheral layer portions and the side margins may be curved from the imaginary line, as long as at least one of the boundaries is curved from the imaginary line. The shapes of the boundaries between the peripheral layer portions and the side margins may be the same as or different from each other.

The following describes the shape of the boundary between the peripheral layer portion 31 and the side margin 41. The same shape thereof is applied to the shapes of the other boundaries between the peripheral layer portions and the side margins.

In view of preventing or reducing separation of the side margin 41, as shown in FIG. 6, the boundary between the peripheral layer portion 31 and the side margin 41 is preferably located inside the imaginary line IL in the width (W) direction. In other words, the boundary between the peripheral layer portion 31 and the side margin 41 is preferably curved inwardly from the imaginary line IL in the width (W) direction.

Further, as shown in FIG. 6, the point Q is preferably located more inwardly than the point P in the width (W) direction. Particularly preferably, the point Q is located more inwardly than the point P in the width (W) direction, and the boundary between the peripheral layer portion 31 and the side margin 41 is curved inwardly from the imaginary line IL in the width (W) direction. The point Q and the point P may be located in the same position in the width (W) direction, or the point Q may be located outside the point P in the width (W) direction.

Figure 7:
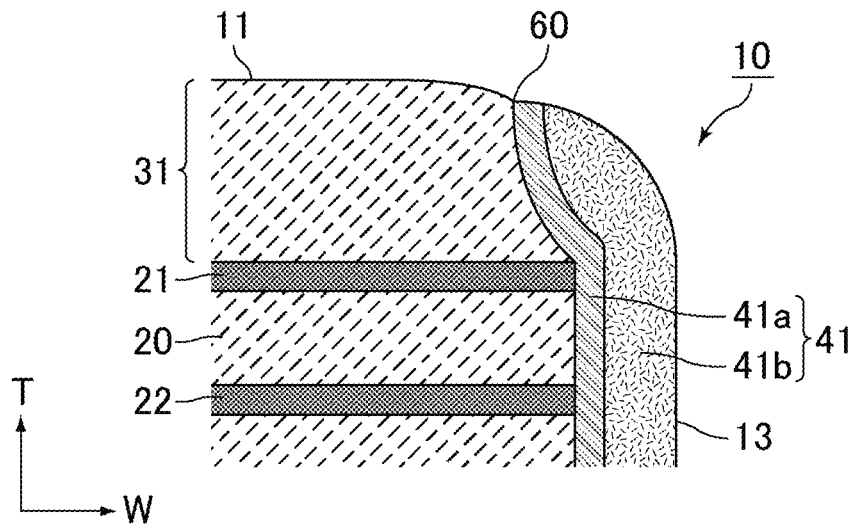
FIG. 7 is another example of an enlarged view of the portion C of the laminate shown in FIG. 4.

FIG. 7 is another example of an enlarged view of the portion C of the laminate shown in FIG. 4. As shown in FIG. 7, the first main surface 11 of the laminate 10 may include a recess 60 at the boundary between the peripheral layer portion 31 and the side margin 41. In the structure in which the recess 60 is provided at the boundary, the peripheral layer portion 31 and the side margin 41 are firmly bonded together, further preventing or reducing the separation.

The side margin 41 preferably includes multiple ceramic layers laminated in the width (W) direction.

Specifically, the side margin 41 preferably includes the inner layer 41a on an innermost side in the width (W) direction and the outer layer 41b on an outermost side in the width (W) direction. The side margin 41 is not limited to the two-layered structure, and has a three- or more layered structure. When the side margin 41 includes three- or more ceramic layers, a ceramic layer on an innermost side in the width (W) direction is the inner layer 41a, and the other ceramic layers including a ceramic layer on an outermost side in the width (W) direction are the outer layers 41b.

Similarly, the side margin 42 preferably includes multiple ceramic layers laminated in the width (W) direction. Specifically, the side margin 42 preferably includes the inner layer 42a on an innermost side in the width (W) direction and the outer layer 42b on an outermost side in the width (W) direction. The side margin 42 is not limited to the two-layered structure, and has a three- or more layered structure. When the side margin 42 includes three- or more ceramic layers, a ceramic layer on an innermost side in the width (W) direction is the inner layer 42a, and the other ceramic layers including a ceramic layer on an outermost side in the width (W) direction are the outer layers 42b.

When the side margin includes the inner layer and the outer layer, while the inner layer can maintain the adhesion between the peripheral layer portion and the central layer portion, the outer layer can improve the mechanical strength of the laminate, for example.

When the side margin has a two-layered structure including the inner layer and the outer layer, since the inner layer and the outer layer have different sinterabilities, observation of these layers using an optical microscope in a dark visual field can confirm that the structure is indeed a two-layered structure. The same applies when the side margin has a three- or more layered structure.

The number of the ceramic layers defining the side margin 41 and the number of the ceramic layers defining the side margin 42 may be the same as or different from each other. The side margins 41 and 42 may each have a structure including only one ceramic layer.

The side margins 41 and 42 each include a ceramic material.

The inner layers 41a and 42a each preferably include, for example, a dielectric ceramic material including as a main component a perovskite compound including Ba and Ti (e.g., $BaTiO_3$). The dielectric ceramic material in the inner layers 41a and 42a may contain, for example, at least one additive selected from the group consisting of Si, Mg, Mn, Al, Zr, Ho, and Zn.

The inner layers 41a and 42a each preferably include the same dielectric ceramic material as that of the dielectric ceramic layer 20 defining the central layer portion 30, and more preferably include the same dielectric ceramic material as that of the dielectric ceramic layer 20 defining the peripheral layer portions 31 and 32. The inner layers 41a and 42a may include a dielectric ceramic material different from that of the dielectric ceramic layer 20 defining the central layer portion 30, and may include a dielectric ceramic material different from that of the dielectric ceramic layer 20 defining the peripheral layer portions 31 and 32.

The outer layers 41b and 42b each preferably include, for example, a dielectric ceramic material including as a main component a perovskite compound including Ba and Ti (e.g., $BaTiO_3$). The dielectric ceramic material in the outer layers 41b and 42b may contain, for example, at least one additive selected from the group consisting of Si, Mg, Mn, Al, Zr, Ho, and Zn.

The outer layers 41b and 42b may include the same dielectric ceramic material as that of the inner layers 41a and 42a, or may include a dielectric ceramic material different from that of the inner layers 41a and 42a.

The outer layers 41b and 42b may include the same dielectric ceramic material as that of the dielectric ceramic layers 20 defining the central layer portion 30, or may include the same dielectric ceramic material as that of the dielectric ceramic layers 20 defining the peripheral layer portions 31 and 32. The outer layers 41b and 42b may include a dielectric ceramic material different from that of the dielectric ceramic layers 20 defining the central layer portion 30, and may include a dielectric ceramic material different from that of the dielectric ceramic layers 20 defining the peripheral layer portions 31 and 32.

The composition of the ceramic material in the side margin 41 may be different from the composition of the ceramic material in the peripheral layer portions 31 and 32. Similarly, the composition of the ceramic material in the side margin 42 may be different from the composition of the ceramic material in the peripheral layer portions 31 and 32. In this case, the composition of the ceramic material in at least one ceramic layer in the side margin 41 or 42 may be different from the composition of the ceramic material in the peripheral layer portions 31 and 32.

When the composition of the ceramic material in the side margin is different from the composition of the ceramic material in the peripheral layer portion, the adhesion between the peripheral layer portion and the side margin is usually weak, which can lead to separation of the side margin from the peripheral layer portion. Even in such a case, the structure in which the boundary between the peripheral layer portion and the side margin is curved can reduce or prevent the separation of the side margin.

Herein, the case where the compositions of the ceramic materials are different from each other means that the types of the elements of the ceramic materials are different from each other, and the contents of the elements are not limited. For example, the case where the compositions of the ceramic materials are different from each other includes the case where one ceramic material includes Elements S1 and S2, and the other ceramic material includes only Element Si, Elements S1 and S3, or Elements Si, S2, and S3.

The types of elements in the ceramic material can be determined as follows: a WT cross section at the central portion in the length (L) direction of the multilayer ceramic capacitor is exposed by polishing or the like and then performing elemental analysis by transmission electron microscope-energy dispersive X-ray spectroscopy (TEM-EDX).

The following describes a preferred thickness of each of the layers and portions of the multilayer ceramic capacitor 1.

The dielectric ceramic layer 20 preferably has a thickness (thickness in the lamination (T) direction) of about 0.55 μm or less, for example. Furthermore, the dielectric ceramic layer 20 preferably has the thickness of about 0.4 μm or more, for example. Here, the thickness of the dielectric ceramic layer 20 specifically means the thickness of the dielectric ceramic layer 20 defining the central layer portion 30.

The first internal electrode layer 21 and the second internal electrode layer 22 each preferably have a thickness (thickness in the lamination (T) direction) of about 0.4 μm or less, and more preferably about 0.38 μm or less, for example. Furthermore, the first internal electrode layer 21 and the second internal electrode layer 22 each preferably have the thickness of about 0.25 μm or more, for example.

The thicknesses of the dielectric ceramic layer 20, the first internal electrode layer 21, and the second internal electrode layer 22 are determined as follows.

Figure 8:
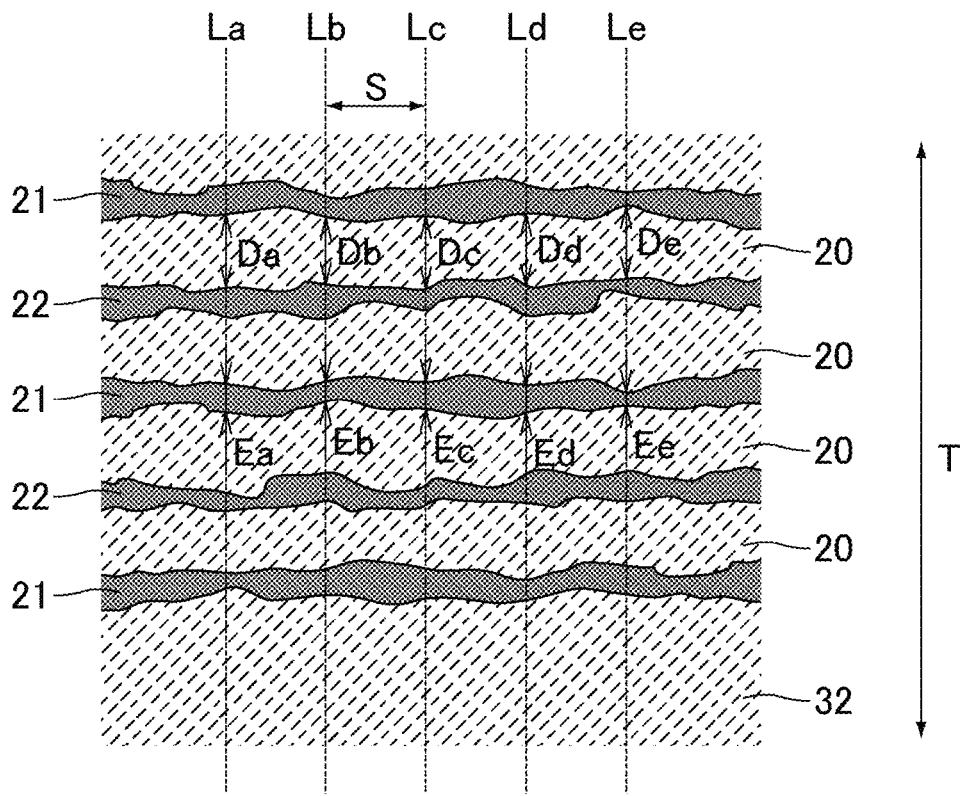
FIG. 8 is a view schematically showing a method of determining the thicknesses of a dielectric ceramic layer and an internal electrode layer.

FIG. 8 is a view schematically showing a method of determining the thicknesses of the dielectric ceramic layer and the internal electrode layer. FIG. 8 is a portion of a WT cross-sectional view at the central portion in the length (L) direction of the multilayer ceramic capacitor 1, and corresponds to a portion of a cross-sectional view taken along the line B-B in FIG. 2.

First, the WT cross section at the central portion in the length (L) direction of the multilayer ceramic capacitor 1 is exposed by polishing. If necessary, the polished surface is etched to remove the first internal electrode layer 21 and the second internal electrode layer 22 stretched by polishing. Then, the exposed WT cross section is observed with a scanning electron microscope (SEM).

Then, in a magnified image observed, a straight line Lc extending in the lamination (T) direction of the laminate 10 and passing through the center or approximate center of the laminate 10 is drawn. Next, multiple straight lines parallel or substantially parallel to the straight line Lc are drawn at equal or substantially equal intervals (pitch S). The pitch S may be determined to be about 5 or more times to about 10 or less times the thickness of the dielectric ceramic layer 20 or the first internal electrode layer 21 or the second internal electrode layer 22 to be measured. For example, when the thickness of a dielectric ceramic layer 20 having a thickness of about 1 μm is measured, the pitch S is set to about 5 μm. When multiple straight lines are drawn parallel or substantially parallel to the straight line Lc, the same number of straight lines is respectively drawn on each of both sides of the straight line Lc. In other words, an odd number of straight lines including the straight line Lc are drawn. FIG. 8 shows five straight lines of straight lines La, Lb, Lc, Ld, and Le.

The thicknesses of the dielectric ceramic layer 20, the first internal electrode layer 21, and the second internal electrode layer 22 are measured on each of the straight lines La, Lb, Lc, Ld, and Le. When on each of the straight lines La, Lb, Lc, Ld, and Le, the first internal electrode layer 21 or the second internal electrode layer 22 is defective and thus the dielectric ceramic layers 20 sandwiching the defective internal electrode layers are connected to each other, or when a magnified image of a measurement position is unclear, the thicknesses of the dielectric ceramic layer 20, the first internal electrode layer 21, and the second internal electrode layer 22 are measured on a straight line which is drawn further away from the straight line Lc.

For example, when the thickness of the dielectric ceramic layer 20 is measured, a thickness Da on the straight line La, a thickness Db on the straight line Lb, a thickness Dc on the straight line Lc, a thickness Dd on the straight line Ld, and a thickness De on the straight line Le are measured as shown in FIG. 8, and the average value of these thicknesses is defined as the thickness of the dielectric ceramic layer 20.

Further, when the thickness of the first internal electrode layer 21 is measured, a thickness Ea on the straight line La, a thickness Eb on the straight line Lb, a thickness Ec on the straight line Lc, a thickness Ed on the straight line Ld, and a thickness Ee on the straight line Le are measured as shown in FIG. 8, and the average value of these thicknesses is defined as the thickness of the first internal electrode layer 21. The thickness of the second internal electrode layer 22 is measured in the same way.

The average thickness of the multiple dielectric ceramic layers 20 is measured, for example, as follows. The thicknesses are measured according to the foregoing method for five dielectric ceramic layers 20 including a dielectric ceramic layer 20 substantially at the center or approximate center in the lamination (T) direction and two dielectric ceramic layers on each side thereof, and the average of the measured thicknesses is set as the average thickness of the dielectric ceramic layers 20. When the lamination number of the dielectric ceramic layers 20 is less than 5, the thicknesses of all of the dielectric ceramic layers 20 are measured according to the above-described method, and the average of the measured thicknesses is set as the average thickness of the dielectric ceramic layers 20. The average thickness of the multiple first internal electrode layers 21 and the average thickness of the multiple second internal electrode layers 22 are determined in the same way.

The peripheral layer portions 31 and 32 each preferably have a thickness (thickness in the lamination (T) direction) of about 15 μm or more and about 40 μm or less, for example.

When the side margin 41 includes the inner layer 41a and the outer layer 41b, in view of maintaining the shape and performance of the multilayer ceramic capacitor 1, the inner layer 41a is preferably thinner than the outer layer 41b. From the same viewpoint, when the side margin 42 includes the inner layer 42a and the outer layer 42b, the inner layer 42a is preferably thinner than the outer layer 42b.

The inner layers 41a and 42a each preferably have a thickness (thickness in the width (W) direction) of about 0.1 μm or more and about 20 μm or less, for example. The inner layers 41a and 42a preferably have the same or substantially the same thickness.

The outer layers 41b and 42b each preferably have a thickness (thickness in the width (W) direction) of about 5 μm or more and about 20 μm or less, for example. The outer layers 41b and 42b preferably have the same or substantially the same thickness.

The side margins 41 and 42 each preferably have a thickness (thickness in the width (W) direction) of about 5 μm or more and about 40 μm or less, and more preferably 5 about μm or more and about 20 μm or less, for example. The side margins 41 and 42 preferably have the same or substantially the same thickness. The outer layer 41b is preferably thicker than the inner layer 41a while the inner layer 41a and the outer layer 41b satisfy the above ranges. Similarly, the outer layer 42b is preferably thicker than the inner layer 42a while the inner layer 42a and the outer layer 42b satisfy the above ranges.

The thicknesses of the ceramic layers (e.g., the inner layer 41a, the inner layer 42a, the outer layer 41b, and the outer layer 42b) defining the side margins 41 and 42 are determined as follows.

First, a WT cross section at the central portion in the length (L) direction of the multilayer ceramic capacitor 1 is exposed by polishing. Then, the WT cross section is photographed using an optical microscope or an electronic microscope such that the ends of the first internal electrode layer 21 and the second internal electrode layer 22 in the width (W) direction and one of the side margins 41 and 42 closer to these ends appear in the same visual field. As the sites to be photographed, an upper portion, a central portion, and a lower portion (three in total) in the lamination (T) direction are selected. In the photographed upper portion, central portion, and lower portion, multiple line segments which are parallel or substantially parallel to the width (W) direction are drawn from the ends of the first internal electrode layer 21 and the second internal electrode layers 22 in the width (W) direction to the lateral surface (an outer end in the width (W) direction of the photographed side margin 41 or 42) of the laminate 10, and the length of each line segment corresponding to each ceramic layer is measured. Thereafter, an average value from measurements of the line segment length is calculated for each of the upper portion, central portion, and lower portion. These average values are further averaged, such that the thickness of each ceramic layer defining the photographed side margin 41 or 42 is determined.

The following dimensions are examples of preferred dimensions of the multilayer ceramic capacitor 1.

Type 1
Dimension in length (L) direction: about 0.32 mm or more and about 0.36 mm or less
Dimension in width (W) direction: about 0.25 mm or more and about 0.30 mm or less
Dimension in lamination (T) direction: about 0.25 mm or more and about 0.30 mm or less
Thickness of dielectric ceramic layer 20: about 4.7 μm or more and about 5.7 μm or less
Thickness of each of first internal electrode layer 21 and second internal electrode layer 22: about 0.9 μm or more and about 1.1 μm or less Type 2
Dimension in length (L) direction: about 0.1 mm or more and about 0.12 mm or less
Dimension in width (W) direction: about 0.63 mm or more and about 0.68 mm or less
Dimension in lamination (T) direction: about 0.62 mm or more and about 0.68 mm or less
Thickness of dielectric ceramic layer 20: about 1.1 μm or more and about 1.5 μm or less
Thickness of each of first internal electrode layer 21 and second internal electrode layer 22: about 0.63 μm or more and about 0.75 μm or less In each of Type 1 and Type 2, the withstand voltage is improved by increasing the thickness of the dielectric ceramic layer 20. On the other hand, by reducing or minimizing the side margins 41 and 42, the effective area in which electrostatic capacitance is generated can be increased or maximized. Furthermore, in the L gap, a step occurs usually due to a difference in thickness between the dielectric ceramic layer 20 and each of the first internal electrode layer 21 and the second internal electrode layer 22, and the first internal electrode layer 21 and the second internal electrode layer 22 are curved in the lamination (T) direction when lamination is performed, and electric field is concentrated at a curved portion to reduce reliability. On the other hand, the dielectric ceramic layer 20 may be formed such that the difference in thickness between the dielectric ceramic layer 20 and each of the first internal electrode layer 21 and the second internal electrode layer 22 is compensated for, such that the first internal electrode layer 21 and the second internal electrode layer 22 can be prevented or reduced from being curved, leading to improved reliability.

Method of Manufacturing Multilayer Ceramic Capacitor

A non-limiting example of a method of manufacturing a multilayer ceramic capacitor according to a preferred embodiment of the present invention preferably includes a step of preparing a green chip having a laminated structure including multiple raw dielectric ceramic layers and multiple pairs of a raw first internal electrode layer and a raw second internal electrode layer, the raw first internal electrode layers and the raw second internal electrode layers being exposed on a first lateral surface and a second lateral surface that oppose each other in a width direction perpendicular to a lamination direction; a step of producing a raw laminate by forming a raw side margin on each of the first lateral surface and the second lateral surface of the green chip; and a step of sintering the raw laminate. Preferably, the step of producing the raw laminate includes forming a raw inner layer on each of the first lateral surface and the second lateral surface, and forming a raw outer layer on the outermost side so as to form the raw side margins.

The following describes an example of a method of manufacturing the multilayer ceramic capacitor 1 shown in FIG. 1.

First, a ceramic green sheet that turns into the dielectric ceramic layers 20 is prepared. The ceramic green sheet includes ceramic raw materials that include the dielectric ceramic material, and components such as a binder and a solvent, for example. The ceramic green sheet is formed on a carrier film using a coater such as a die coater, a gravure coater, or a micro gravure coater, for example.

Figure 9A:
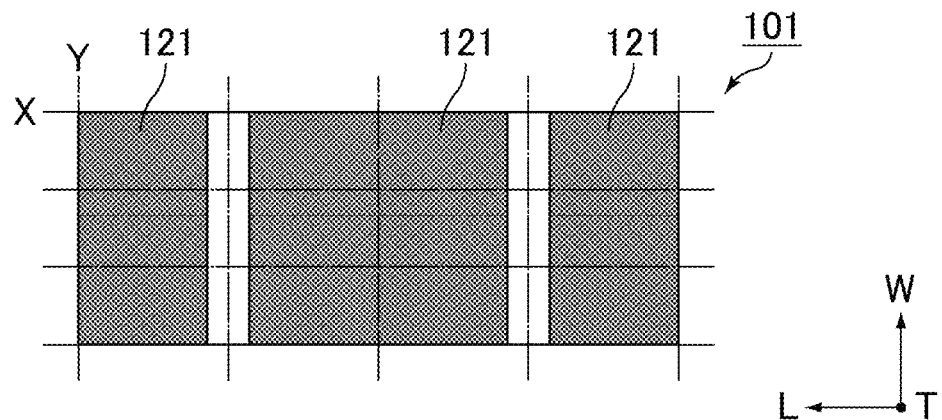
FIGS. 9A to 9C are plan views each schematically showing an example of a ceramic green sheet according to a preferred embodiment of the present invention.
Figure 9B:
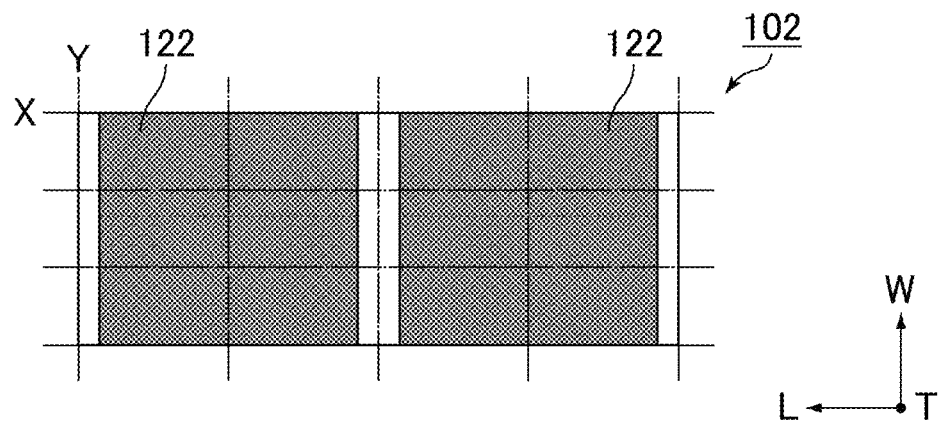
Figure 9C:
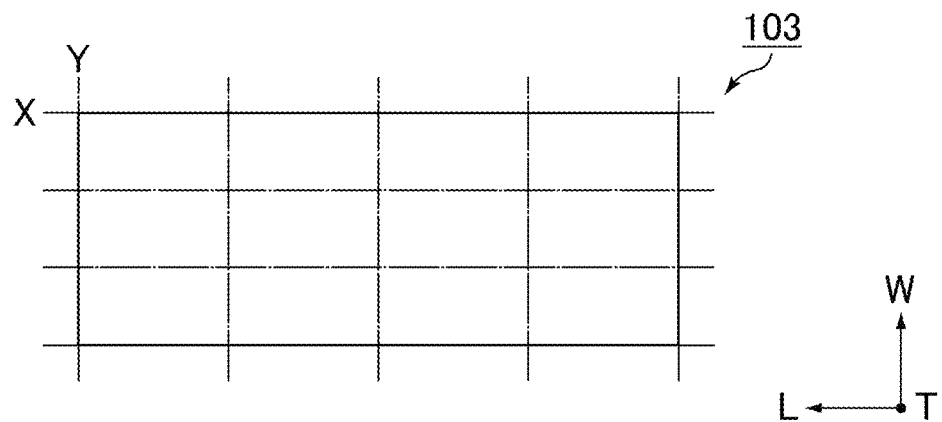

FIGS. 9A to 9C are plan views each schematically showing an example of a ceramic green sheet according to a preferred embodiment of the present invention. FIG. 9A shows a first ceramic green sheet 101 for forming the central layer portion 30. FIG. 9B shows a second ceramic green sheet 102 for forming the central layer portion 30. FIG. 9C shows a third ceramic green sheet 103 for forming the peripheral layer portion 31 or 32.

In FIGS. 9A to 9C, the first ceramic green sheet 101, the second ceramic green sheet 102, and the third ceramic green sheet 103 are not cut and divided for each multilayer ceramic capacitor 1. FIGS. 9A to 9C show cutting lines X and Y for cutting and dividing the ceramic green sheets for each multilayer ceramic capacitor 1. The cutting lines X are parallel or substantially parallel to the length (L) direction. The cutting lines Y are parallel or substantially parallel to the width (W) direction.

As shown in FIG. 9A, raw first internal electrode layers 121 corresponding to the first internal electrode layers 21 are formed on the first ceramic green sheet 101. As shown in FIG. 9B, raw second internal electrode layers 122 corresponding to the second internal electrode layers 22 are formed on the second ceramic green sheet 102. As shown in FIG. 9C, neither the raw first internal electrode layers 121 nor the raw second internal electrode layers 122 are formed on the third ceramic green sheet 103 corresponding to the peripheral layer portion 31 or 32.

The raw first internal electrode layers 121 and the raw second internal electrode layers 122 can be formed by using any internal electrode layer-conductive paste, for example. A printing method, such as screen printing or gravure printing can be used, for example, to form the raw first internal electrode layers 121 and the raw second internal electrode layers 122 with the internal electrode layer-conductive paste.

The raw first internal electrode layers 121 and the raw second internal electrode layers 122 are each disposed over two regions adjacent to each other divided by the cutting lines Y in the length (L) direction, and extend in a band shape in the width (W) direction. The raw first internal electrode layers 121 are shifted by one column relative to the raw second internal electrode layers 122 in the length (L) direction divided by the cutting lines Y. In other words, a cutting line Y passing through the center of each raw first internal electrode layer 121 passes through a region between the raw second internal electrode layers 122 (a region where no raw second internal electrode layer 122 is formed), and a cutting line Y passing through the center of the raw second internal electrode layer 122 passes through a region between the raw first internal electrode layers 121 (a region where no raw first internal electrode layer 121 is formed).

Thereafter, the first ceramic green sheets 101, the second ceramic green sheets 102, and the third ceramic green sheets 103 are laminated together to produce a mother block.

Figure 10:
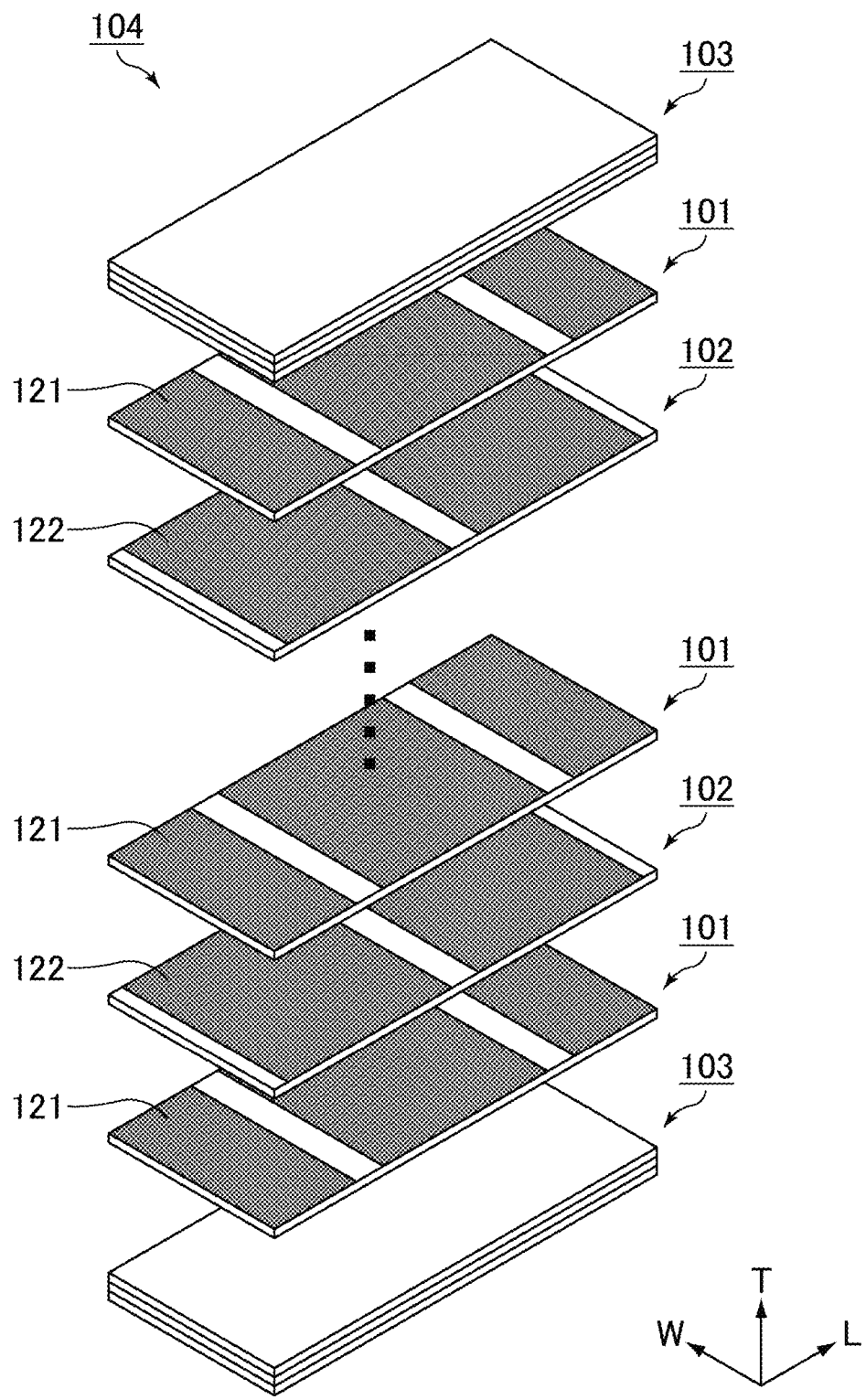
FIG. 10 is an exploded perspective view schematically showing an example of a mother block according to a preferred embodiment of the present invention.

FIG. 10 is an exploded perspective view schematically showing an example of a mother block according to a preferred embodiment of the present invention. FIG. 10 shows an exploded view of a mother block 104 including the first ceramic green sheets 101, the second ceramic green sheets 102, and the third ceramic green sheets 103. In the actual mother block 104, the first ceramic green sheets 101, the second ceramic green sheets 102, and the third ceramic green sheets 103 are compressed and integrated together by, for example, isostatic pressing.

In the mother block 104, the first ceramic green sheets 101 and the second ceramic green sheets 102 corresponding to the central layer portion 30 are alternately laminated in the lamination (T) direction. Further, the third ceramic green sheets 103 corresponding to the peripheral layer portions 31 and 32 are laminated on the upper surface and lower surface in the lamination (T) direction of the first ceramic green sheets 101 and the second ceramic green sheets 102 which are alternately laminated. While FIG. 10 shows three third ceramic green sheets 103 laminated on each of the upper surface and lower surface, the number of the third ceramic green sheets 103 can be suitably varied.

Next, the mother block 104 is cut along the cutting lines X and Y (see FIGS. 9A to 9C), such that multiple green chips are produced. The mother block 104 may be cut by a cutting method such as dicing, force-cutting, or laser cutting, for example.

Figure 11:
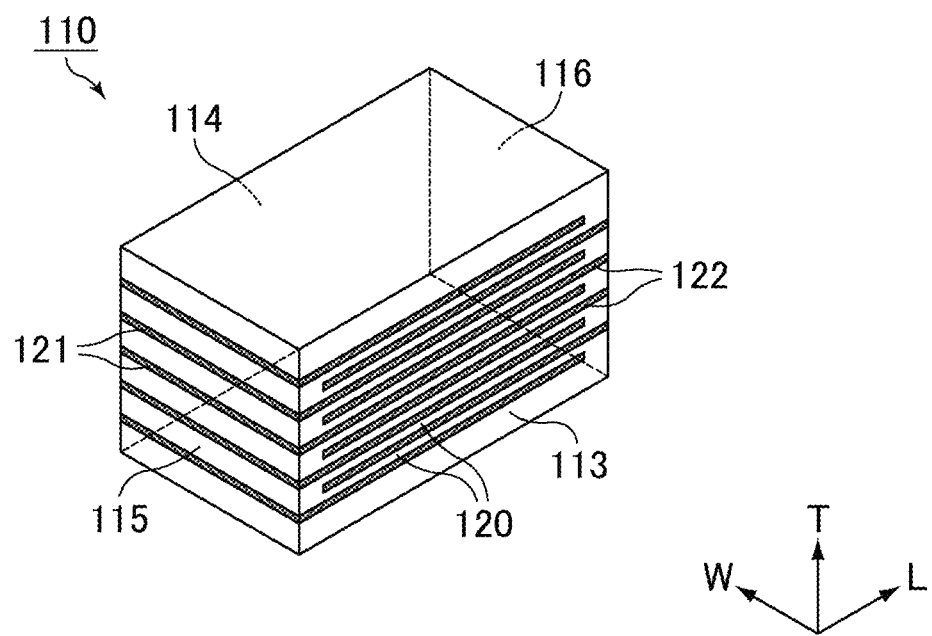
FIG. 11 is a perspective view schematically showing an example of a green chip according to a preferred embodiment of the present invention.

FIG. 11 is a perspective view schematically showing an example of a green chip according to a preferred embodiment of the present invention. A green chip 110 shown in FIG. 11 has a laminated structure including the multiple raw dielectric ceramic layers 120, the multiple raw first internal electrode layers 121, and the multiple raw second internal electrode layers 122.

A first lateral surface 113 and a second lateral surface 114 of the green chip 110 are surfaces formed from cutting the mother block 104 along cutting lines X. The raw first internal electrode layers 121 and the raw second internal electrode layers 122 are both exposed on the first lateral surface 113 and the second lateral surface 114.

A first end surface 115 and a second end surface 116 of the green chip 110 are surfaces formed from cutting the mother block 104 along cutting lines Y. As for the raw first internal electrode layers 121 and the raw second internal electrode layers 122, only the raw first internal electrode layers 121 are exposed on the first end surface 115, and only the raw second internal electrode layers 122 are exposed on the second end surface 116.

Next, the raw side margins are formed on the first lateral surface 113 and the second lateral surface 114 of the green chip 110, such that a raw laminate is produced.

The raw side margins are formed, for example, by bonding side-margin ceramic green sheets to the first lateral surface 113 and the second lateral surface 114 of the green chip 110.

When the side margin includes two layers including the inner layer and the outer layer, the raw side margin is formed in the following way.

First, in order to produce an inner-layer ceramic green sheet, an inner-layer ceramic slurry is produced which includes components such as a binder and a solvent in addition to ceramic raw materials that include a dielectric ceramic material including $BaTiO_3$ or the like as a main component. Si that defines and functions as a sintering aid may be added to the inner-layer ceramic slurry. The inner layer defines and functions as an adhesive to the green chip 110.

Next, in order to produce an outer-layer ceramic green sheet, an outer-layer ceramic slurry is produced which includes components such as a binder and a solvent in addition to ceramic raw materials that include a dielectric ceramic material including, for example, $BaTiO_3$ or the like as a main component. Si that defines and functions as a sintering aid may be added to the outer-layer ceramic slurry. The content of Si in the inner-layer ceramic green sheet is preferably larger than the content of Si in the outer-layer ceramic green sheet. Each content of Si is determined from the size of an area where Si is detected that is obtained by photographing the cross section of each sheet by WDX.

Next, the outer-layer ceramic slurry is applied to the surface of a resin film and dried, such that an outer-layer ceramic green sheet is produced. The inner-layer ceramic slurry is applied to the surface of the outer-layer ceramic green sheet remote from the resin film and dried, such that an inner-layer ceramic green sheet is produced. Thereafter, a laminate sheet including the inner-layer ceramic green sheet and the outer-layer ceramic green sheet is separated from the resin film. Thus, a side-margin ceramic green sheet having a two-layered structure is obtained.

The side-margin ceramic green sheet having a two-layered structure can also be obtained, for example, by producing the inner-layer ceramic green sheet and the outer-layer ceramic green sheet separately in advance and bonding them together. The structure of the side-margin ceramic green sheet is not limited to the two-layered structure, and may be a three- or more layered structure.

Subsequently, the first lateral surface 113 of the green chip 110 is pressed against the inner-layer ceramic green sheet side of the side margin ceramic green sheet, and punched out, such that the raw side margin is formed on the first lateral surface 113 of the green chip 110. Further, the second lateral surface 114 of the green chip 110 is pressed against the inner-layer ceramic green sheet of the side-margin ceramic green sheet, and punched out, such that the raw side margin is formed on the second lateral surface 114 of the green chip 110. Here, an organic solvent that defines and functions as an adhesive is preferably applied to the first lateral surface 113 and the second lateral surface 114 of the green chip 110 in advance. Thus, the raw laminate is obtained.

Figure 12:
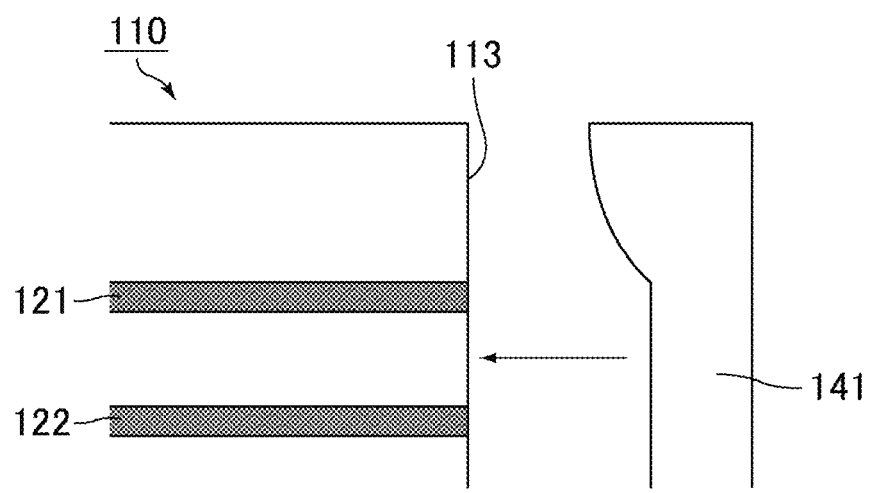
FIG. 12 is a schematic view illustrating an example of a method of bonding a side-margin ceramic green sheet according to a preferred embodiment of the present invention.

FIG. 12 is a schematic view illustrating an example of a method of bonding a side-margin ceramic green sheet according to a preferred embodiment of the present invention. In FIG. 12, a side-margin ceramic green sheet 141 including a thick end is bonded to the first lateral surface 113 of the green chip 110. The end of the side-margin ceramic green sheet 141 is bonded to fit to a portion corresponding to the peripheral layer portion 31. This can provide a curved boundary between the peripheral layer portion 31 and the side margin 41 in the sintered laminate 10. The recess 60 (see FIG. 7) can be provided at the boundary between the peripheral layer portion 31 and the side margin 41 by changing the shape of the end of the side-margin ceramic green sheet 141. The same applies to the other boundaries between the peripheral layer portions and the side margins.

Figure 13:
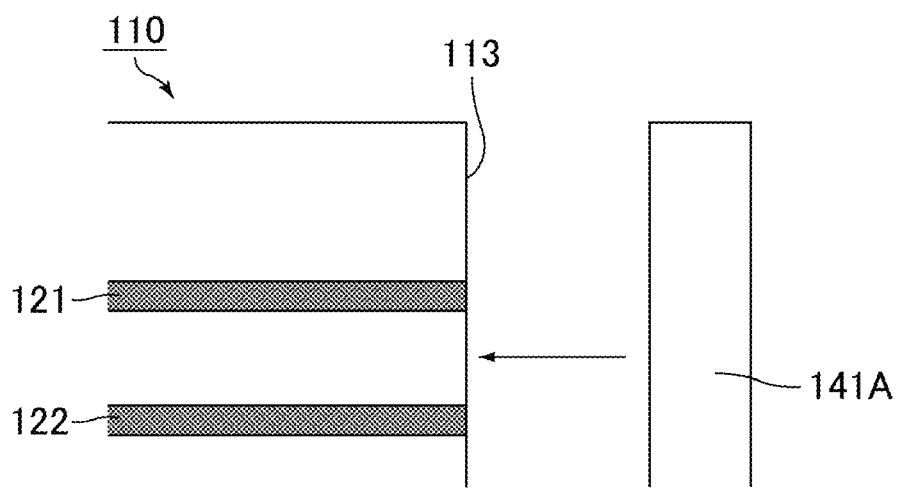
FIG. 13 is a schematic view illustrating another example of a method of bonding a side-margin ceramic green sheet according to a preferred embodiment of the present invention.

FIG. 13 is a schematic view illustrating another example of a method of bonding a side-margin ceramic green sheet according to a preferred embodiment of the present invention. In FIG. 13, a side-margin ceramic green sheet 141A having a uniform or substantially uniform thickness is bonded to the first lateral surface 113 of the green chip 110. The composition of the ceramic material in the side-margin ceramic green sheet 141A is different from the composition of the ceramic material in the third ceramic green sheet 103 corresponding to the peripheral layer portion 31. This causes a difference in thermal shrinkage between the peripheral layer portion 31 and the side margin 41 during sintering the laminate 10, and thus can provide a curved boundary between the peripheral layer portion 31 and the side margin 41. The recess 60 (see FIG. 7) can be provided at the boundary between the peripheral layer portion 31 and the side margin 41 by changing the composition of the ceramic material in the side-margin ceramic green sheet 141A and the composition of the ceramic material in the third ceramic green sheet 103 corresponding to the peripheral layer portion 31. The same applies to the other boundaries between the peripheral layer portions and the side margins.

When the side-margin ceramic green sheet 141 having a thick end is used, the composition of the ceramic material in the side-margin ceramic green sheet 141 may be different from the composition of the ceramic material in the third ceramic green sheet 103 corresponding to the peripheral layer portion 31.

The raw side margin may be provided, for example, by applying a side-margin ceramic slurry to the first lateral surface 113 and the second lateral surface 114 of the green chip 110.

When the side margin includes two layers including the inner layer and the outer layer, first, the inner-layer ceramic slurry is applied to each of the first lateral surface 113 and the second lateral surface 114 of the green chip 110 and dried to provide a raw inner layer. Then, the outer-layer ceramic slurry is applied to the raw inner layer surface remote from the green chip 110 and dried to provide a raw outer layer. Thus, the raw side margin is formed.

Alternatively, the side-margin ceramic slurry may be applied by the following method. When the side margin includes two layers including the inner layer and the outer layer, first, the first end surface 115 and the second end surface 116 of the green chip 110 are covered (masked) with resin or the like. Then, the whole green chip 110 in which the end surfaces are covered with resin or the like is immersed (dipped) in the inner-layer ceramic slurry and dried to provide a raw inner layer. Thereafter, the whole green chip 110 with the raw inner layer is immersed (dipped) in the outer-layer ceramic slurry and dried to provide a raw outer layer. In this case, the raw inner layer and the raw outer layer are formed also on the raw peripheral layer portion.

The raw laminate obtained by the foregoing method is preferably subjected to barrel polishing or the like. The corners and edges of the sintered laminate 10 are rounded by polishing the raw laminate.

Thereafter, in the raw laminate, an external-electrode conductive paste including, for example, Ni and a ceramic material is applied to each end surface of the first end surface 115 and the second end surface 116 of the green chip 110.

The external-electrode conductive paste preferably includes, as a ceramic material, the same dielectric ceramic material as that of the outer-layer ceramic green sheet or the outer-layer ceramic slurry. The content of the ceramic material in the external-electrode conductive paste is preferably about 15% by weight or more, for example. Further, the content of the ceramic material in the external-electrode conductive paste is preferably about 25% by weight or less, for example.

Next, the raw laminate to which the external-electrode conductive paste has been applied is, for example, degreased under predetermined conditions in a nitrogen atmosphere, and then sintered at a predetermined temperature in a nitrogen-hydrogen-steam mixed atmosphere. As a result, the raw laminate and the external-electrode conductive paste are simultaneously sintered, and the laminate 10, the Ni layer to be connected to the first internal electrode layer 21, and the Ni layer to be connected to the second internal electrode layer 22 are simultaneously formed by a co-fire method. Thereafter, a first plating layer obtained by Ni plating and a second plating layer obtained by Sn plating are sequentially laminated on the surface of each Ni layer. As a result, the first external electrode 51 and the second external electrode 52 are formed.

The laminate 10, the first external electrode 51, and the second external electrode 52 may be formed at different times by a post-fire method. Specifically, the raw laminate is, for example, degreased under predetermined conditions in a nitrogen atmosphere, and then sintered at a predetermined temperature in a nitrogen-hydrogen-steam mixture atmosphere. Thus, the laminate 10 is formed. Then, a Cu powder-including conductive paste is applied to and baked on each of the first end surface 15 and the second end surface 16 of the laminate 10. Thus, a base electrode layer to be connected to the first internal electrode layer 21 and a base electrode layer to be connected to the second internal electrode layer 22 are formed. Thereafter, a conductive resin layer including conductive particles (e.g., metal particles of Cu, Ag, Ni or the like) and a resin, a first plating layer obtained by Ni plating, and a second plating layer obtained by Sn plating are sequentially laminated on the surface of each base electrode layer. Thus, the first external electrode 51 and the second external electrode 52 are formed.

The multilayer ceramic capacitor 1 is manufactured as described above.

In the above method of manufacturing the multilayer ceramic capacitor 1, the mother block 104 is cut along the cutting lines X and Y to produce multiple green chips 110, and then, the raw side margin is formed on each of the first lateral surface 113 and the second lateral surface 114 of the green chip 110 to produce a raw laminate. Yet, the present preferred embodiment may be modified as follows.

Specifically, the mother block 104 is cut along the cutting lines X to produce multiple rod-shaped green blocks in which the raw first internal electrode layers 121 and the raw second internal electrode layers 122 are exposed to lateral surfaces that emerged from the cutting. Then, the raw side margins are formed on the lateral surfaces of each green block, and the green blocks are cut along the cutting lines Y to produce multiple raw laminates. Thereafter, the same steps as described above are performed, such that multilayer ceramic capacitors 1 can be manufactured.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A multilayer ceramic capacitor comprising:
a laminate including a dielectric ceramic layer and an internal electrode layer that are laminated in a lamination direction; and
an external electrode connected to the internal electrode layer; wherein
the laminate includes a first main surface and a second main surface that oppose each other in the lamination direction, a first lateral surface and a second lateral surface that oppose each other in a width direction perpendicular or substantially perpendicular to the lamination direction, and a first end surface and a second end surface that oppose each other in a length direction perpendicular or substantially perpendicular to the lamination direction and the width direction;
the internal electrode layer includes a first internal electrode layer extending to the first end surface and a second internal electrode layer extending to the second end surface so as to oppose the first internal electrode layer with the dielectric ceramic layer therebetween;
the external electrode includes a first external electrode disposed on the first end surface and connected to the first internal electrode layer, and a second external electrode disposed on the second end surface and connected to the second internal electrode layer;
the laminate includes a central layer portion in which the first internal electrode layer and the second internal electrode layer are alternately laminated with the dielectric ceramic layer therebetween, peripheral layer portions sandwiching the central layer portion in the lamination direction, and side margins sandwiching the central layer portion and the peripheral layer portions in the width direction;
each of the side margins includes an inner layer on an innermost side in the width direction and an outer layer on an outermost side in the width direction;
each of the inner layers is in contact with the central layer portion and the peripheral layer portions in the width direction;

a dimension of each of the inner layers in the lamination direction is greater than a dimension of the central layer portion in the lamination direction; and when viewing the laminate through a cross section parallel or substantially parallel to the width direction and the lamination direction at a central portion in the length direction of the laminate, a point P indicates an end in the width direction of the internal electrode layer closest to the first main surface or the second main surface of the laminate, a point Q indicates a point where a boundary between the peripheral layer portions including the point P and the side margins including the point P intersects the first main surface or the second main surface of the laminate, and an imaginary line IL is drawn to pass through the point P and the point Q, the boundary is curved from the imaginary line IL.

2. The multilayer ceramic capacitor according to claim 1, wherein when viewing the laminate through the cross section parallel or substantially parallel to the width direction and the lamination direction at the central portion in the length direction of the laminate, the boundary is curved inwardly from the imaginary line IL in the width direction.

3. The multilayer ceramic capacitor according to claim 2, wherein when viewing the laminate through the cross section parallel or substantially parallel to the width direction and the lamination direction at the central portion in the length direction of the laminate, the point Q is located more inwardly than the point P in the width direction.

4. The multilayer ceramic capacitor according to claim 1, wherein when viewing the laminate through the cross section parallel or substantially parallel to the width direction and the lamination direction at the central portion in the length direction of the laminate, the first main surface or the second main surface of the laminate includes a recess at the boundary.

5. The multilayer ceramic capacitor according to claim 1, wherein the side margins include a ceramic material having a composition different from a composition of a ceramic material in the peripheral layer portions.

6. The multilayer ceramic capacitor according to claim 1, wherein the first internal electrode layer and the second internal electrode layer each have a thickness of about 0.4 μm or less.

7. The multilayer ceramic capacitor according to claim 6, wherein the first internal electrode layer and the second internal electrode layer each have a thickness of about 0.38 μm or less.

8. The multilayer ceramic capacitor according to claim 1, wherein the dielectric ceramic layer has a thickness of about 0.55 μm or less.

9. The multilayer ceramic capacitor according to claim 1, wherein
the first external electrode and the second external electrode each include a Ni layer including Ni and a ceramic material; and
the ceramic material is present in the Ni layer in an amount of about 25 area % or more and about 40 area % or less.

10. The multilayer ceramic capacitor according to claim 9, wherein the ceramic material is present in the Ni layer in an amount of about 25 area % or more and about 35 area % or less.

11. The multilayer ceramic capacitor according to claim 1, wherein each of the first and second internal electrode layers includes at least one metal selected from the group consisting of Ni, Cu, Ag, Pd, Au, and Ag—Pd alloy.

12. The multilayer ceramic capacitor according to claim 1, wherein the first external electrode extends from the first end surface of the laminate over a portion of each of the first main surface and the second main surface.

13. The multilayer ceramic capacitor according to claim 1, wherein the first external electrode extends from the first end surface of the laminate over a portion of each of the first main surface, the second main surface, the first lateral surface, and the second lateral surface.

14. The multilayer ceramic capacitor according to claim 1, wherein the second external electrode extends from the second end surface of the laminate over a portion of each of the first main surface and the second main surface.

15. The multilayer ceramic capacitor according to claim 1, wherein the second external electrode extends from the second end surface of the laminate over a portion of each of the first main surface, the second main surface, the first lateral surface, and the second lateral surface.

16. The multilayer ceramic capacitor according to claim 1, wherein each of the first and second external electrodes includes a Ni layer, a first plating layer, and a second plating layer in order.

17. The multilayer ceramic capacitor according to claim 16, wherein the first plating layer is a Ni plating layer.

18. The multilayer ceramic capacitor according to claim 16, wherein the second plating layer is an Sn plating layer.

19. The multilayer ceramic capacitor according to claim 1, wherein the dielectric ceramic layer includes as a main component a perovskite compound including Ba and Ti.

* * * * *